(12) United States Patent
Kalkbrenner

(10) Patent No.: US 6,632,008 B2
(45) Date of Patent: Oct. 14, 2003

(54) LIGHT-PIPE

(75) Inventor: Peter R. Kalkbrenner, Eden Prairie, MN (US)

(73) Assignee: ADC Broadband Access Systems, Inc., Westborough, MA (US)

( * ) Notice: Subject to any disclaimer, the term of this patent is extended or adjusted under 35 U.S.C. 154(b) by 0 days.

(21) Appl. No.: 10/008,651

(22) Filed: Nov. 9, 2001

(65) Prior Publication Data

US 2003/0090909 A1 May 15, 2003

(51) Int. Cl.[7] ................................................. G02B 6/04
(52) U.S. Cl. .................. 362/554; 362/551; 362/558; 362/582
(58) Field of Search .......................... 362/554, 551, 362/555, 26, 800, 558, 582; 385/901

(56) References Cited

U.S. PATENT DOCUMENTS 5,760,754 A * 6/1998 Amero et al. .................. 345/82
6,252,254 B1 * 6/2001 Soules et al. .................. 257/89

* cited by examiner

*Primary Examiner*—Sandra O'Shea
*Assistant Examiner*—Guiyoung Lee
(74) *Attorney, Agent, or Firm*—Fogg and Associates, LLC; Laura A. Ryan

(57) ABSTRACT

Embodiments of the present invention provide light-pipes having improved alignment and light collection capability. In one embodiment, a light-pipe is provided that has a first end for collecting light from a light source, a second end for outputting the light collected at the first end, and a shaft interconnecting the first and second end for transferring the light from the first end to the second end. The first end has a concavity for receiving a lens of the light source therein.

51 Claims, 7 Drawing Sheets

LIGHT-PIPE

TECHNICAL FIELD

The present invention relates generally to the field of light and, in particular, to light-pipes.

BACKGROUND

Light-pipes are used in numerous applications to transfer light from one location to another. For example, light-pipes are often used to transfer light from a light source, e.g., a light emitting diode (LED), located within a housing to an exterior of the housing for viewing. Light pipes normally have a collector end that is positioned adjacent the light source for collecting light from the light source. The collected light is transferred through the light pipe and is output at an output end of the light pipe, for example, at the exterior of the housing. Typically, there is a loss in light intensity between the light source and the output end of the light pipe. Most of this loss usually occurs between the light source and the collector end.

In some applications, it is desirable to transfer light from arrays of light sources using arrays of light pipes. One problem with using arrays of light pipes to transfer light from arrays of light sources is that it is difficult to align each of the light sources of the light source array with the collector end of each of the light-pipes of the light-pipe array. Improper alignment between the collector end of a light-pipe and a light source can reduce the amount of light that can be collected by the light-pipe, resulting in decreased intensity at the output end of the light-pipe. Moreover, many arrays of light sources use diffused lenses, e.g., diffused lens LEDs, that spread the light over a larger viewing angle than light sources using non-diffused lenses. However, the light-pipes of most conventional light-pipe arrays are not effective at collecting light that is produced using diffused lenses. Therefore, the intensity of the light at the output end of these light-pipes is often less than desirable.

For the reasons stated above, and for other reasons stated below which will become apparent to those skilled in the art upon reading and understanding the present specification, there is a need in the art for light-pipes having improved alignment and light collection capability.

SUMMARY

The above-mentioned problems with collecting light using light-pipes and other problems are addressed by embodiments of the present invention and will be understood by reading and studying the following specification. Embodiments of the present invention provide light-pipes having improved alignment and light collection capability.

More particularly, in one embodiment, a light-pipe is provided that has a first end for collecting light from a light source, a second end for outputting the light collected at the first end, and a shaft interconnecting the first and second end for transferring the light from the first end to the second end. The first end has a concavity for receiving a lens of the light source therein.

In another embodiment, a light-pipe array is provided. The light-pipe array includes a plurality of light-pipes. Each of the plurality of light-pipes has first and second ends interconnected by a shaft. The first end of each of the plurality of light-pipes includes a concavity for respectively receiving a lens of each of an array of light sources. The second end of each of the plurality of light-pipes is for respectively outputting the light collected at the first end of each of the plurality of light-pipes. The shaft of each of the plurality of light-pipes is for transferring the light from the first end to the second end of each of the plurality of light-pipes. A flange is disposed between the first end and the second end of each of the plurality of light-pipes.

Other embodiments are described and claimed.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
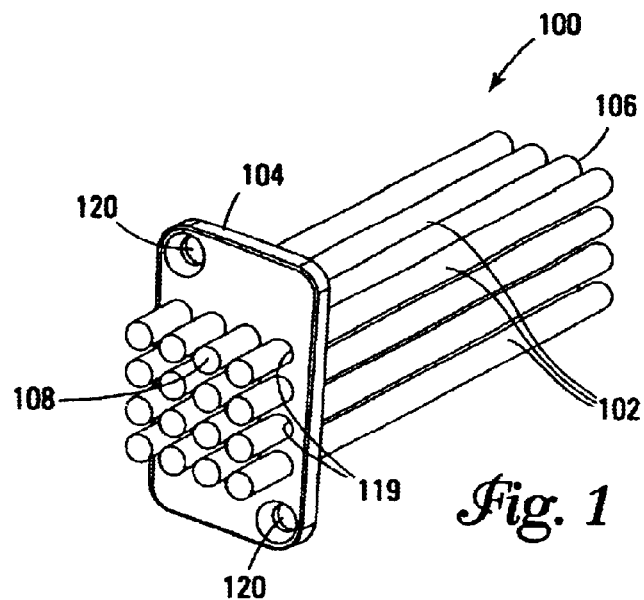
FIG. 1 is an isometric view of an embodiment of a light-pipe array according to the teachings of the present invention.
Figure 2:
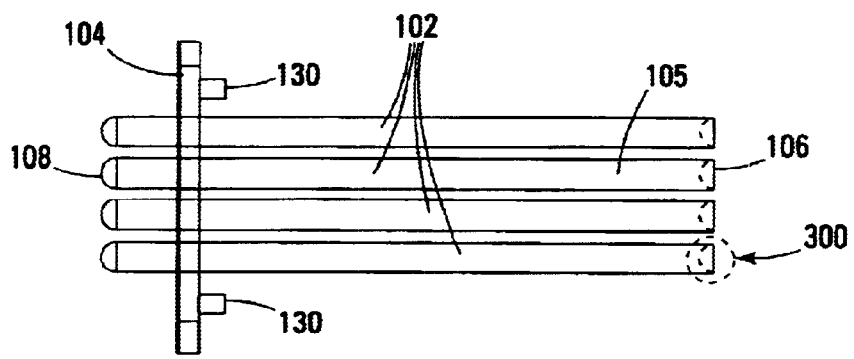
FIG. 2 is a side view of the light-pipe array of FIG. 1.

FIGS. 1 and 2 are respectively isometric and side views showing an embodiment of a light-pipe array 100 according to the teachings of the present invention. Light-pipe array 100 includes a number of light-pipes 102. Each of light-pipes 102 includes a shaft 105 that interconnects a collector end 106 and an output end 108. Collector end 106 collects light from a light source, e.g., located within a housing. The light is transferred by shaft 105 to output end 108, e.g., for viewing exterior to the housing.

Figure 3:
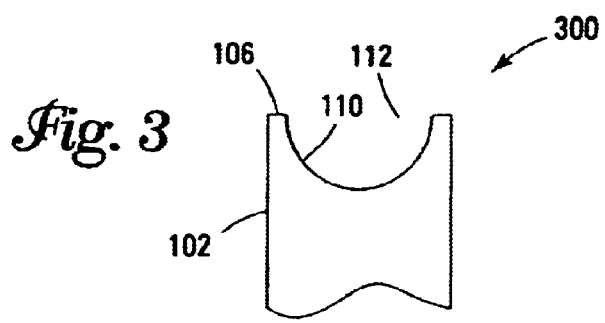
FIG. 3 is an enlarged cross-sectional view of region 300 in FIG. 2.

Collector end 106 includes a concave surface 110 that defines a concavity 112 at collector end 106, as shown in FIG. 3, an enlarged cross-sectional view of region 300 of FIG. 2. In one embodiment, concavity 112 receives a lens of a light source, as described below. Shaft 105 of each of light pipes 102 passes through each of an array of apertures 119 in a flange 104. In One embodiment, shaft 105 of each light-pipe 102 is secured to flange 104, by gluing, by a press-fit, etc. In another embodiment, light-pipes 102 are fabricated from polycarbonate, acrylic, or any other material suitable for transmitting light. In some embodiments, light-pipes 102 are injection molded. In another embodiment, light pipes 102 and flange 104 are integral and are molded as a single unit, e.g., using injection molding.

Figure 4:
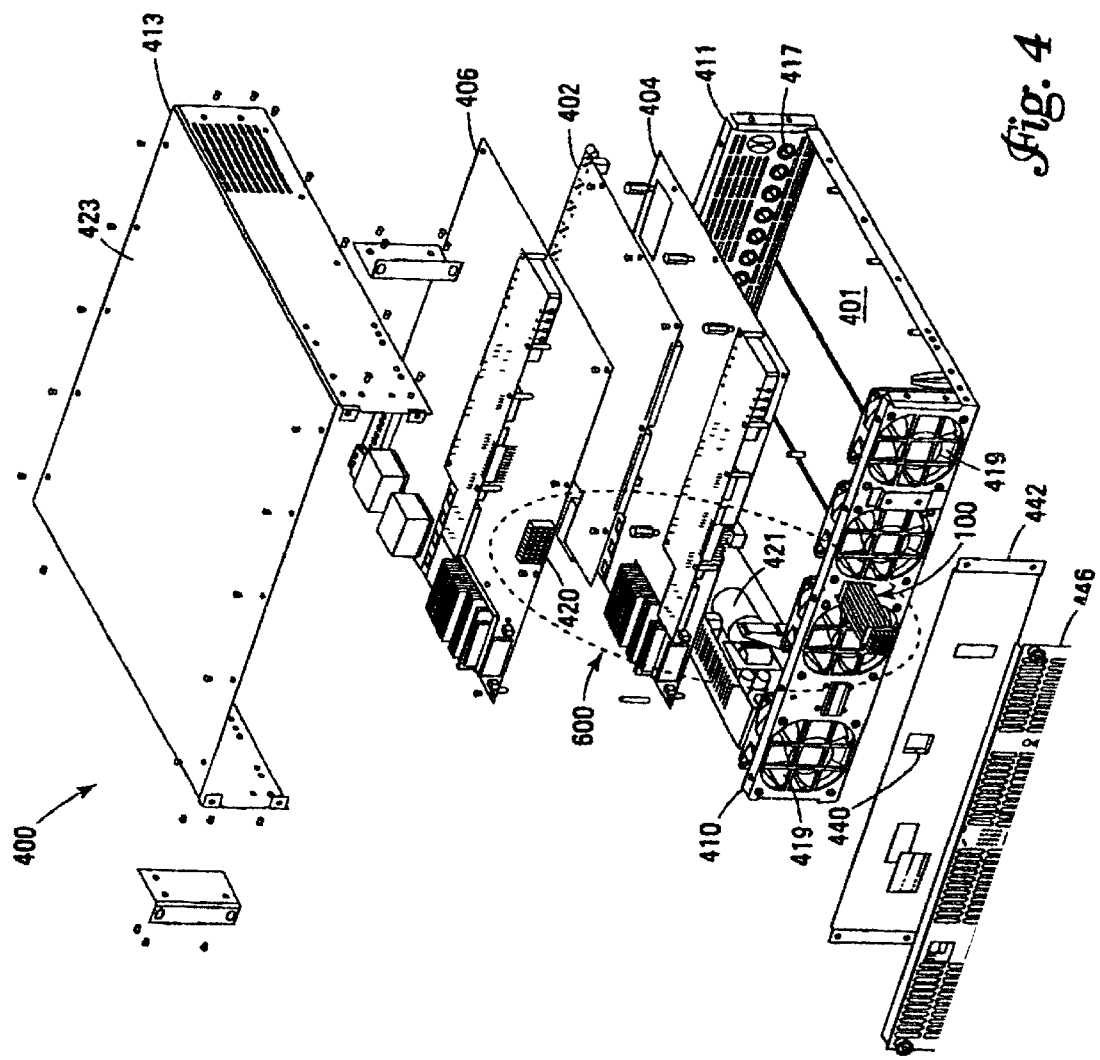
FIG. 4 is an exploded view showing an embodiment of an installation of the light-pipe of FIG. 1 in an embodiment of a housing according to the teachings of the present invention.
Figure 5:
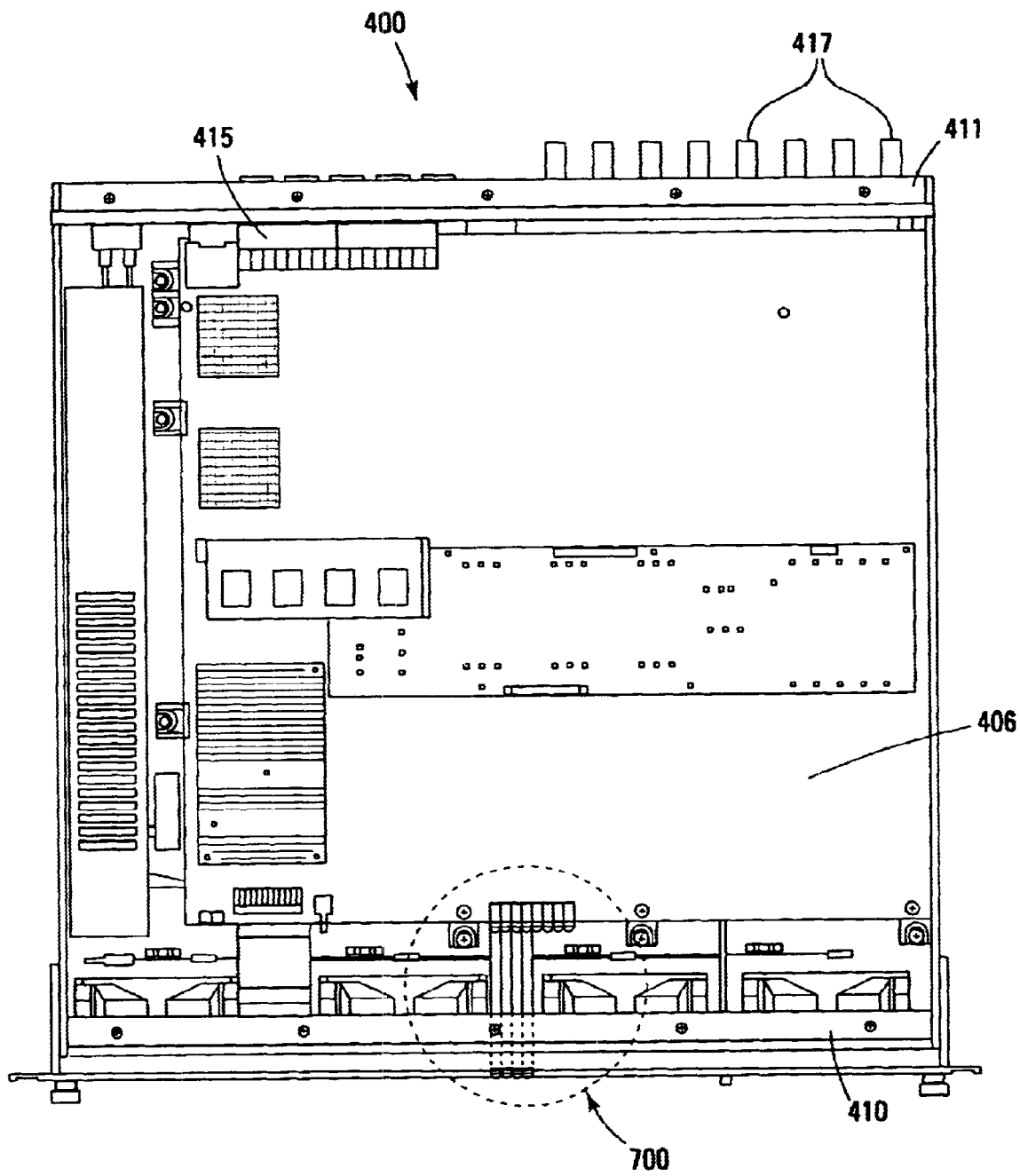
FIG. 5 is a top view of the housing of FIG. 4.

FIGS. 4 through 8 illustrate light pipe array 100 as used to convey light from an interior to an exterior of a housing 400. FIGS. 4 and 5 are respectively exploded and top views of housing 400. Housing 400 has a base 401, walls 410 and 411, and cover 413. Wall 411 includes a circuit board 415 mounted thereon, as shown in FIG. 5, and a number of receptacles 417 that extend therethrough. In one embodiment, receptacles 417 are coaxial receptacles for receiving coaxial connectors. In another embodiment, a number of fans 419 are mounted on wall 410. In some embodiments, a perforated panel 442, such as an air filter, and a panel 446 are secured to wall 410, as shown in FIG. 4. Housing 400 also includes a power supply 421 that is mounted to base 401. In one embodiment, base 401 and walls 410 and 411 are integral. In another embodiment, base 401, walls 410 and 411, and cover 413 are fabricated from aluminum, steel, plastic, or the like.

In one embodiment, housing 400 contains circuit boards 402, 404, and 406. Circuit boards 402, 404, and 406 are aligned with each other, are respectively spaced from each other, and are sandwiched between base 401 and a portion 423 of cover 413. Circuit boards 404 and 406 plug into circuit board 415, and circuit board 402 plugs into receptacles 417 and is electrically connected to circuit board 404. In one embodiment, a light-source array, e.g., an LED array 420, is mounted on circuit board 406 and is electrically connected to circuitry on circuit board 406, for example, by soldering.

In one embodiment, housing 400 houses a cable modem termination system. In this embodiment, circuit board 402 receives data from cable modems as analog radio frequency signals, converts the radio frequency signals into digital data packets, and transmits the digital data packets to circuit board 404, which, in this embodiment, is a cable modem termination system circuit board. Circuit board 404 transmits the digital data packets to circuit board 406. Circuit board 406 outputs the digital data packets as signals to a data network, e.g., the Internet. Circuit board 406 also receives digital data packets as signals from a data network and transmits the digital data packets to circuit board 404. In one embodiment, one or more individual LEDs of LED array 420 lights when circuit board 406 outputs or receives data packets. Circuit board 404 transmits the digital data packets to circuit board 402. Circuit board 402 converts the digital data packets into analog radio frequency signals and transmits the radio frequency signals to the cable modems. In another embodiment, circuit boards 402, 404, and 406 comprise circuit boards from a CUDA 12000 cable modem termination system commercially available from ADC Telecommunications of Eden Prairie, Minn.

Figure 6:
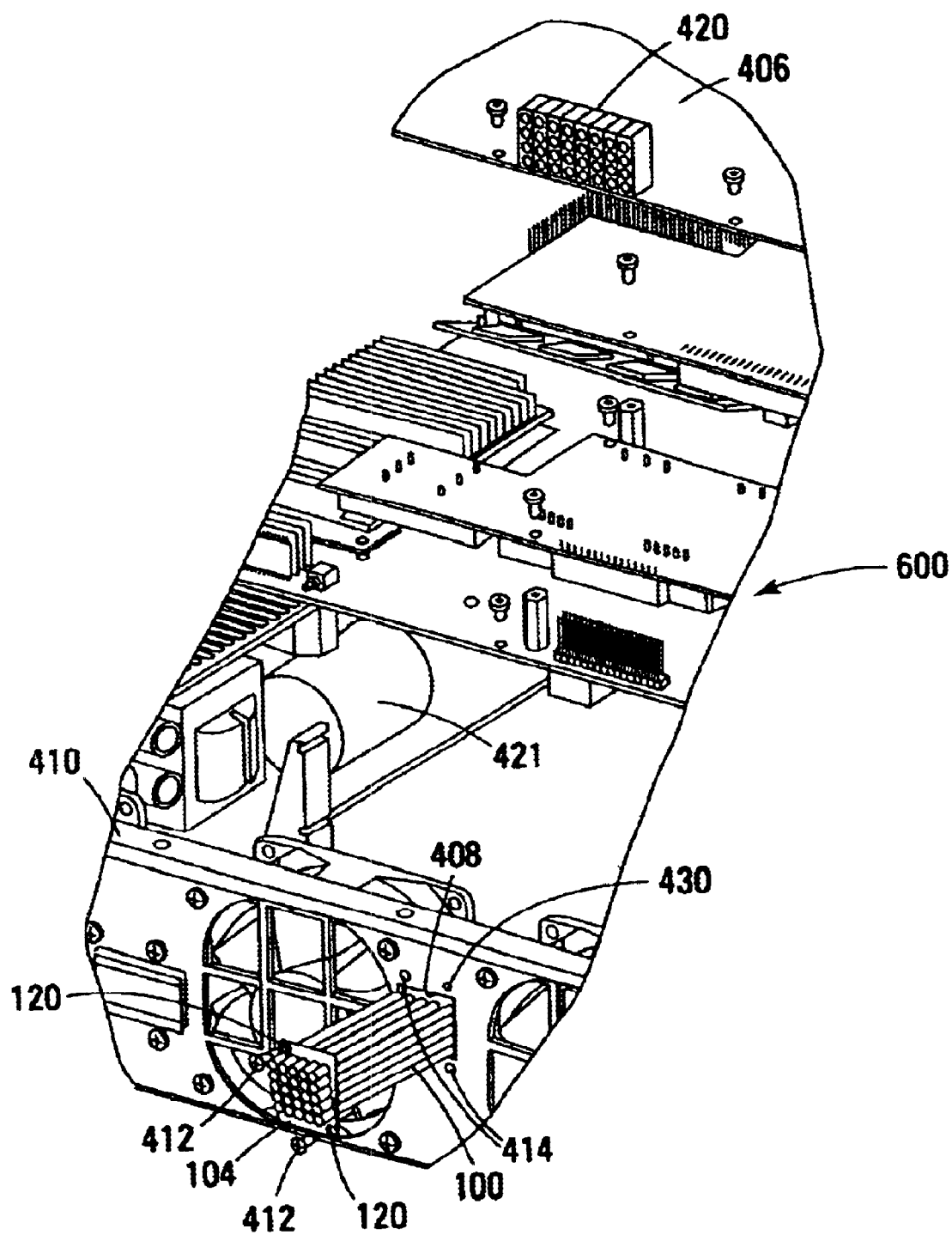
FIG. 6 is an enlarged view of region 600 in FIG. 4.
Figure 7:
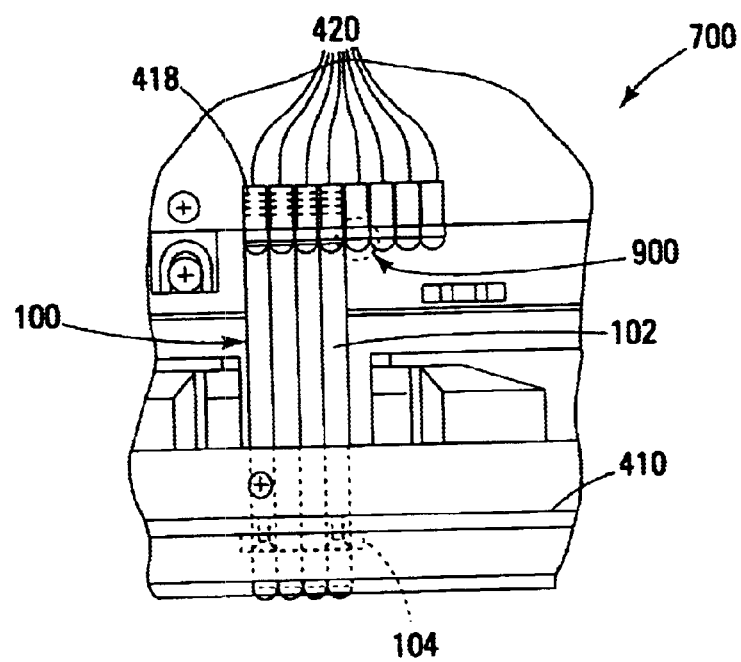
FIG. 7 is an enlarged view of region 700 in FIG. 5.
Figure 8:
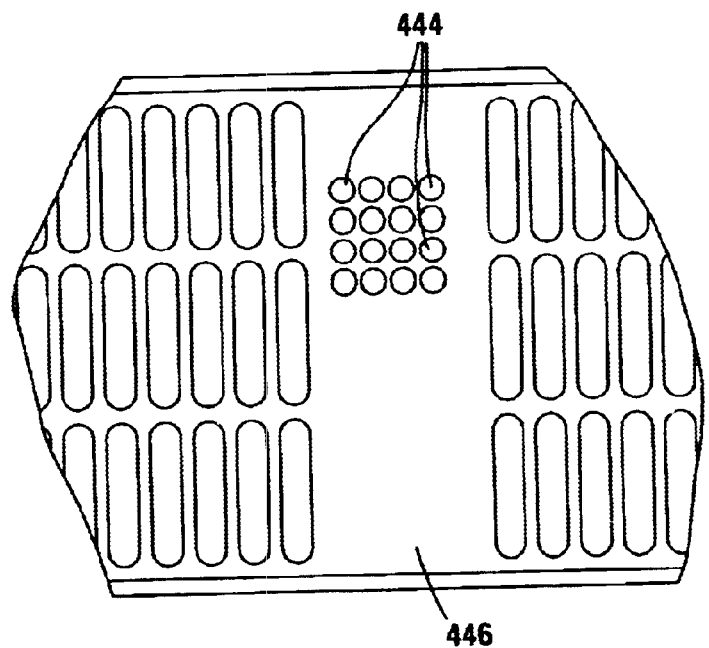
FIG. 8 is an enlarged view of region 800 in FIG. 4.

FIG. 6, an enlarged view of region 600 of FIG. 4, shows that light-pipe array 100 is received in an aperture 408 of wall 410 of housing 400. Light-pipe array 100 is moved through aperture 408 toward LED array 420 until each of light-pipes 102 aligns with an LED 418 of LED array 420 and flange 104 abuts wall 410, as shown in FIG. 7, an enlarged view of region 700 of FIG. 5. In another embodiment, apertures 120 in flange 104 (shown in FIGS. 1 and 6), receive fasteners 412, e.g., Philips- or slot-head screws. In other embodiments, fasteners 412 screw into apertures 414 of wall 410 to secure flange 104 to wall 410, as shown in FIG. 5, for anchoring light-pipe array 100 to housing 400.

In one embodiment, flange 104 includes studs 130, as shown in FIG. 2. Each of studs 130, in one embodiment, is received by an aperture in wall 410, such as aperture 430 shown in FIG. 6, to help align each of light-pipes 102 respectively with the LEDs 418 of LED array 420. In another embodiment, each of studs 130 is pressed into apertures in wall 410 for anchoring light-pipe array 100 to housing 400 in lieu of fasteners 412. In one embodiment, an aperture 440 in filter 442 receives output ends 108. In another embodiment, each of output ends 108 is respectively received by each of apertures 444 (shown in FIG. 8, an enlarged view of region 800 in FIG. 4) of panel 446 of housing 400.

During operation, in one embodiment, an LED 418 lights while, for example, circuit board 406 is transmitting data packets to or receiving data packets from a data network, power supply 421 is on, or the like. The collector end 106 of a light pipe 102 aligned with the LED 418 collects the light given off by LED 418. The collected light is then transferred from the collector end 106 to the output end 108 of the light pipe 102 for viewing, in one embodiment, at panel 446.

Figure 9:
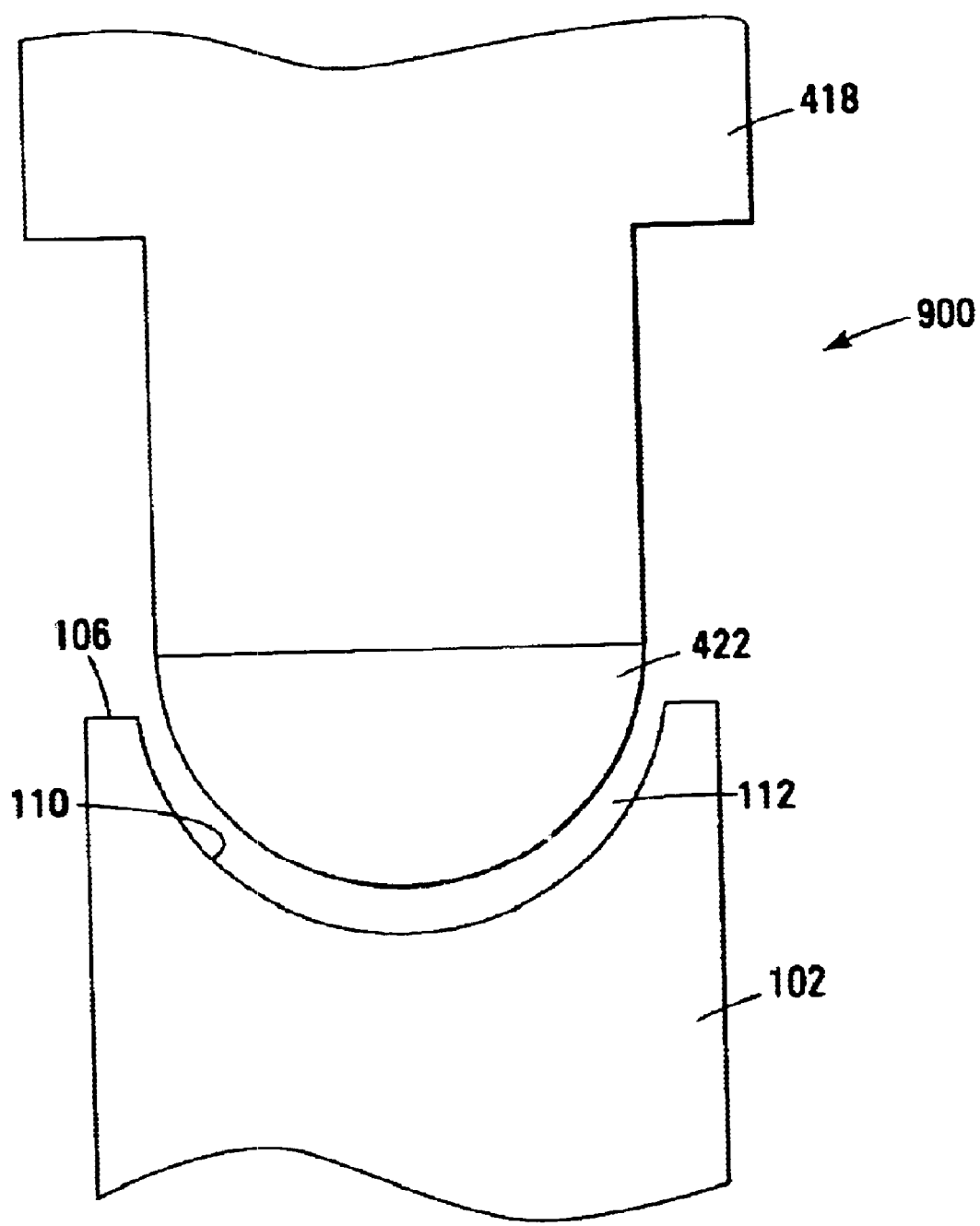
FIG. 9 is an enlarged view of region 900 in FIG. 7.

As shown in FIG. 9, an enlarged cross-sectional view of region 900 of FIG. 7, concavity 112 of collector end 106 of each of light-pipes 102 respectively receives a lens 422 of each of LEDs 418 of LED array 420. In one embodiment, the profile of lens 422 closely matches the profile of concave surface 110. This enables more light to impinge on concave surface 110 and thus be collected. In one embodiment, lens 422 is a diffused lens (e.g., an epoxy containing glass particles for diffusing light) or a non-diffused lens (e.g., a clear lens).

Figure 10:
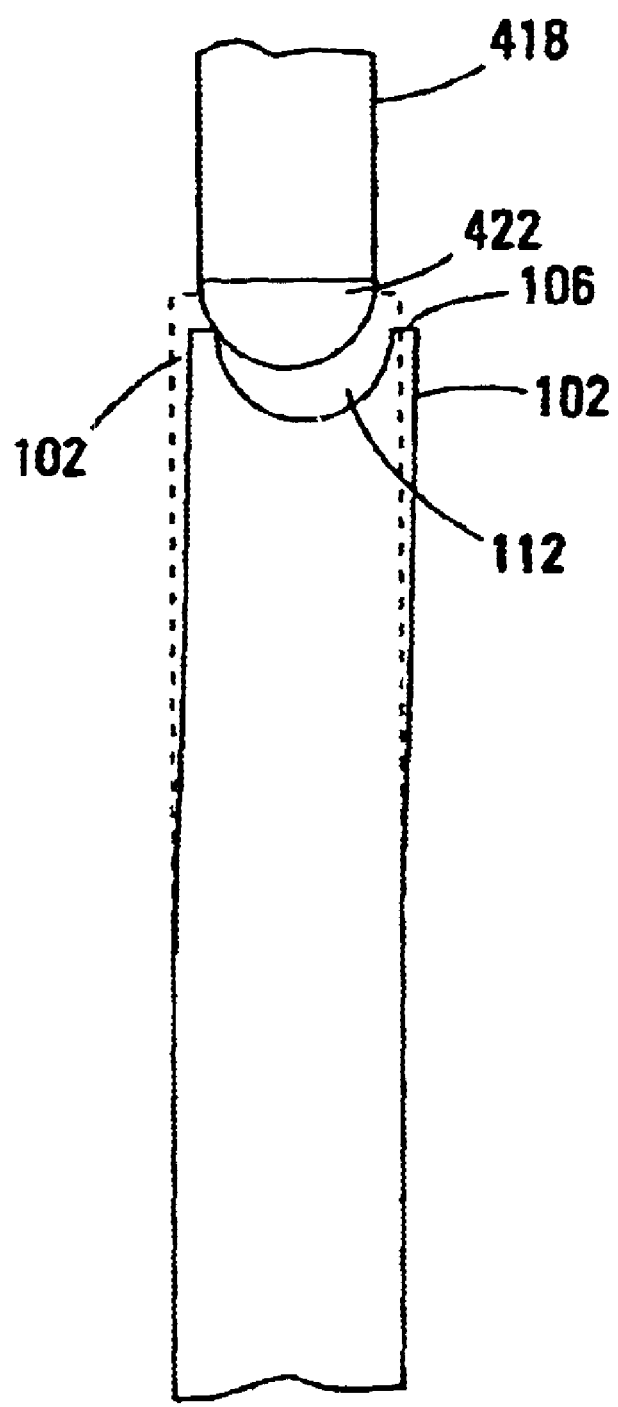
FIG. 10 illustrates an embodiment of a method for aligning a light-pipe with a light source according to the teachings of the present invention.

Concave surface 110 also provides a self-alignment feature that enables collector end 106 to align itself with lens 422 as light-pipe array 100 is moved toward light source array 420. For example, as the concavity of a misaligned light-pipe receives lens 422, such as concavity 112 of the light-pipe 102 depicted by solid lines in FIG. 10, lens 422 deflects the light-pipe into alignment with lens 422, as shown by the light-pipe 102 depicted by dashed lines in FIG. 10.

CONCLUSION

Embodiments of the present invention have been described. The embodiments provide light-pipes having improved alignment and light collection capability. More particularly, in one embodiment, a light-pipe is provided that has a first end for collecting light from a light source, a second end for outputting the light collected at the first end, and a shaft interconnecting the first and second end for transferring the light from the first end to the second end. The first end has a concavity for receiving a lens of the light source therein. The concavity enables more light to be collected and provides a self-alignment feature that enables the first end to self-align with the lens.

Although specific embodiments have been illustrated and described in this specification, it will be appreciated by those of ordinary skill in the art that any arrangement that is calculated to achieve the same purpose may be substituted for the specific embodiment shown. This application is intended to cover any adaptations or variations of the present invention. For example, light-pipe array 100 is not limited to use with housing 400. Instead, embodiments of light-pipe array 100 can be used in any situation involving transferring light from a light-source array to a remote location. Moreover, light-pipe array 100 is not limited to a square array, but can be implemented as a rectangular array, a circular array, etc.

What is claimed is:

1. A light-pipe comprising:
   a first end for collecting light from a light source, the first end comprising a concavity for receiving a lens of the light source therein;

a second end for outputting the light collected at the first end; and a shaft interconnecting the first and second end for transferring the light from the first end to the second end;

wherein the concavity of the first end is adapted to self-align the light-pipe with the lens of the light source.

2. The light-pipe of claim 1, wherein the light source is electrically connected to a cable modem termination system.

3. The light-pipe of claim 1, wherein the shaft passes through a flange such that the flange is disposed between the first and second ends.

4. The light-pipe of claim 3, wherein the flange is securable to a housing for anchoring the light pipe to the housing.

5. The light-pipe of claim 1, wherein the light-pipe is secured to a flange.

6. The light-pipe of claim 1, wherein the light-pipe is integral with a flange.

7. The light-pipe of claim 1, wherein the light source is mounted on a circuit board.

8. The light-pipe of claim 1, wherein the light source is mounted in a housing.

9. The light-pipe of claim 8, wherein the second end is located exterior to the housing.

10. A light-pipe array comprising:

a plurality of light-pipes, each of the plurality of light-pipes comprising first and second ends interconnected by a shaft;

the first end of each of the plurality of light-pipes comprising a concavity for respectively receiving a lens of each of an array of light sources;

the second end of each of the plurality of light-pipes for respectively outputting the light collected at the first end of each of the plurality of light-pipes;

the shaft of each of the plurality of light-pipes for transferring the light from the first end to the second end of each of the plurality of light-pipes; and a flange disposed between the first end and the second end of each of the plurality of light-pipes;

wherein the concavity is adapted to self-align the light-pipe with the lens of the respective light source of the array of light sources.

11. The light-pipe of claim 10, wherein the plurality of light-pipes is secured to the flange.

12. The light-pipe of claim 10, wherein the plurality of light-pipes and the flange are integral.

13. The light-pipe array of claim 10, wherein the array of light sources is mounted on a circuit board.

14. The light-pipe array of claim 13, wherein the circuit board is the circuit board of a cable modem termination system.

15. The light-pipe array of claim 10, wherein the flange is for securing the light-pipe array to a housing.

16. The light-pipe array of claim 10, wherein the array of light sources is mounted in a housing.

17. The light-pipe array of claim 16, wherein the second end is located exterior to the housing.

18. An electronic module, comprising:

a housing;

a first circuit board disposed within the housing;

an array of light sources located within the housing; and an array of light-pipes, each of the array of light-pipes for respectively transferring light from each of the array of light sources to a location exterior to the housing;

each of the array of light-pipes comprising a concavity that respectively receives each of the array of light-sources therein;

wherein the concavity is adapted to self-align the light-pipe with the lens of the respective light source.

19. The electronic module of claim 18, wherein the first circuit board outputs signals.

20. The electronic module of claim 18, wherein the first circuit board receives data packets from a data network and outputs data packets to the data network.

21. The electronic module of claim 18, further comprising a second circuit board for receiving digital data packets from the first circuit board.

22. The electronic module of claim 21, further comprising a third circuit board for receiving the digital data packets from the second circuit board, converting the digital data packets into analog signals, and transmitting the analog signals to a cable modem.

23. The electronic module of claim 18, further comprising a second circuit board for transmitting digital data packets to the first circuit board.

24. The electronic module of claim 23, further comprising a third circuit board for receiving analog signals from a cable modem, converting the analog signals into the digital data packets, and transmitting the digital data packets to the second circuit board.

25. The electronic module of claim 18, wherein a flange anchors the array of light-pipes to the housing.

26. The electronic module of claim 18, wherein each of the array of light sources is a light emitting diode.

27. The electronic module of claim 18, wherein each of the array of light sources comprises a lens.

28. The electronic module of claim 27, wherein the lens of each of the array of light sources comprises particles for diffusing light.

29. The electronic module of claim 18, wherein light transferred from one or more of the array of light sources to a location exterior to the housing is indicative of operation of the electronic module.

30. The electronic module of claim 18, wherein the array of light sources is mounted on the first circuit board.

31. A cable modem termination system, comprising:

a housing;

a first circuit board for receiving first digital data packets and second digital data packets and for outputting the first digital data packets and transmitting the second digital data packets;

a second circuit board for receiving the first digital data packets and transmitting the first digital data packets to the first circuit board and for receiving the second digital data packets from the first circuit board and transmitting the second digital data packets;

a third circuit board for receiving a first analog signal from a cable modem, converting the first analog signal into the first digital data packets, and transmitting the first digital data packets to the second circuit board and for receiving the second digital data packets from the second circuit board, converting the second digital data packets into a second analog signal, and transmitting the second analog signal to the cable modem; an array of light sources located in the housing; and an array of light-pipes, each of the array of light-pipes for respectively transferring light from each of the array of light sources to a location exterior to the housing, wherein light transferred by one or more of the array of light-pipes is indicative of operation of the cable modem termination system;

each of the array of light-pipes comprising a concavity that respectively receives each of the array of light sources therein;

wherein the concavity is adapted to self-align the light-pipe with the lens of a respective light source of the array of light sources.

32. The cable modem termination system of claim 31, wherein the first analog signal is a radio frequency signal.

33. The cable modem termination system of claim 31, wherein the second analog signal is a radio frequency signal.

34. The cable modem termination system of claim 31, wherein the first circuit board outputs the first digital data packets to a data network and receives the second digital data packets from the data network.

35. The cable modem termination system of claim 31, wherein a flange anchors the array of light-pipes to the housing.

36. The cable modem termination system of claim 31, wherein each of the array of light sources comprises particles for diffusing light.

37. The cable modem termination system of claim 31, wherein the array of light sources is mounted on the first circuit board.

38. A method for manufacturing a light-pipe array, the method comprising:
   forming a plurality of light-pipes, each of the plurality of light-pipes comprising first and second ends, the first end comprising a concavity for receiving a light source therein; and
   disposing a flange between the first and second ends of each of the plurality of light-pipes so that each of the plurality of light-pipes passes through the flange at a distinct location of the flange;
   wherein the concavity is adapted to self-align the light-pipe with a lens of the light source.

39. The method of claim 38, wherein forming the plurality of light-pipes comprises molding.

40. The method of claim 38, wherein forming the plurality of light-pipes and disposing the flange between the first and second ends of each of the plurality of light-pipes comprises integrally forming the plurality of light-pipes and the flange.

41. The method of claim 40, wherein integrally forming the plurality of light-pipes and the flange comprises using a molding process.

42. The method of claim 38, further comprising forming the flange.

43. The method of claim 38, further comprising forming an ray of apertures in the flange.

44. The method of claim 38, wherein disposing the flange between the first and second ends of each of the plurality of light-pipes comprises respectively passing each of the plurality of light-pipes trough each of an array of apertures in the flange.

45. A method for installing an array of light-pipes, the method comprising:
   moving the array of light-pipes toward an array of light sources; and
   respectively receiving each of the array of light sources in a concavity in a first end of each of the array of light-pipes;
   wherein respectively receiving each of the array of light sources in the concavity comprises deflecting one or more of the array of light-pipes into alignment with one or more of the array of light sources.

46. The method of claim 45, wherein moving the array of light-pipes comprises moving the array of light-pipes through an aperture.

47. The method of claim 45, further comprising anchoring the array of light-pipes to a surface.

48. The method of claim 47, wherein anchoring the array of light-pipes to the surface comprises using a flange, wherein the flange is disposed between the first end and a second end of each of the array of light-pipes.

49. The method of claim 47, wherein anchoring the array of light-pipes to the surface comprises anchoring the array of light-pipes to a housing.

50. The method of claim 45, further comprising receiving a second end of each of the array of light-pipes respectively through each of a plurality of apertures in a panel.

51. The method of claim 50, further comprising securing the panel to a housing.

* * * * *